(12) United States Patent
Burns et al.

(10) Patent No.: US 8,690,099 B2
(45) Date of Patent: Apr. 8, 2014

(54) AIRCRAFT AND PROPULSION SYSTEM

(75) Inventors: Donald Burns, Avon, IN (US); Kaushik Rajashekara, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 372 days.

(21) Appl. No.: 12/947,482

(22) Filed: Nov. 16, 2010

(65) Prior Publication Data

US 2012/0119021 A1   May 17, 2012

(51) Int. Cl.
    *B64D 41/00* (2006.01)
(52) U.S. Cl.
    USPC .............................. 244/58; 244/57; 244/53 R
(58) Field of Classification Search
    USPC ........................................... 244/58, 57, 53 R
    See application file for complete search history.

(56) References Cited

U.S. PATENT DOCUMENTS

| | | | |
|---|---|---|---|
| 3,834,161 A * | 9/1974 | Quigley et al. | 60/244 |
| 5,349,814 A * | 9/1994 | Ciokajlo et al. | 60/226.1 |
| 5,553,449 A | 9/1996 | Rodgers et al. | |
| 5,813,630 A | 9/1998 | Williams | |
| 5,899,411 A | 5/1999 | Latos et al. | |
| 6,256,977 B1 | 7/2001 | McGinley et al. | |
| 6,634,596 B2 | 10/2003 | Albero et al. | |
| 6,641,084 B1 | 11/2003 | Huber et al. | |
| 6,704,625 B2 | 3/2004 | Albero et al. | |
| 6,834,831 B2 | 12/2004 | Daggett | |
| 7,105,937 B2 | 9/2006 | Hoppe et al. | |
| 7,117,683 B2 | 10/2006 | Thompson | |
| 7,207,521 B2 | 4/2007 | Atkey et al. | |
| 7,306,871 B2 | 12/2007 | Grieve et al. | |
| 7,380,749 B2 | 6/2008 | Fucke et al. | |
| 7,513,119 B2 | 4/2009 | Zielinski et al. | |
| 7,882,691 B2 * | 2/2011 | Lemmers et al. | 60/39.163 |
| 2004/0129835 A1 * | 7/2004 | Atkey et al. | 244/118.5 |
| 2006/0042252 A1 * | 3/2006 | Derouineau | 60/703 |
| 2006/0260323 A1 * | 11/2006 | Moulebhar | 60/793 |
| 2007/0101721 A1 * | 5/2007 | Dooley et al. | 60/721 |
| 2007/0151258 A1 * | 7/2007 | Gaines et al. | 60/792 |
| 2008/0070078 A1 | 3/2008 | Gummalla et al. | |
| 2008/0217466 A1 | 9/2008 | Bhargava | |
| 2009/0007569 A1 * | 1/2009 | Lemmers et al. | 60/792 |
| 2009/0072080 A1 | 3/2009 | Bhargava | |

* cited by examiner

*Primary Examiner* — Tien Dinh
*Assistant Examiner* — Justin Benedik
(74) *Attorney, Agent, or Firm* — Krieg DeVault LLP

(57) ABSTRACT

One embodiment of the present invention is a unique aircraft. Another embodiment is a unique propulsion system for an aircraft. Other embodiments include apparatuses, systems, devices, hardware, methods, and combinations for aircraft and aircraft propulsion systems. Further embodiments, forms, features, aspects, benefits, and advantages of the present application will become apparent from the description and figures provided herewith.

22 Claims, 3 Drawing Sheets

US 8,690,099 B2

AIRCRAFT AND PROPULSION SYSTEM

FIELD OF THE INVENTION

The present invention relates to aircraft and propulsion systems for aircraft.

BACKGROUND

Propulsion systems for aircraft, remain an area of interest. Some existing systems have various shortcomings, drawbacks, and disadvantages relative to certain applications. Accordingly, there remains a need for further contributions in this area of technology.

SUMMARY

One embodiment of the present invention is a unique aircraft. Another embodiment is a unique propulsion system for an aircraft. Other embodiments include apparatuses, systems, devices, hardware, methods, and combinations for aircraft and aircraft propulsion systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
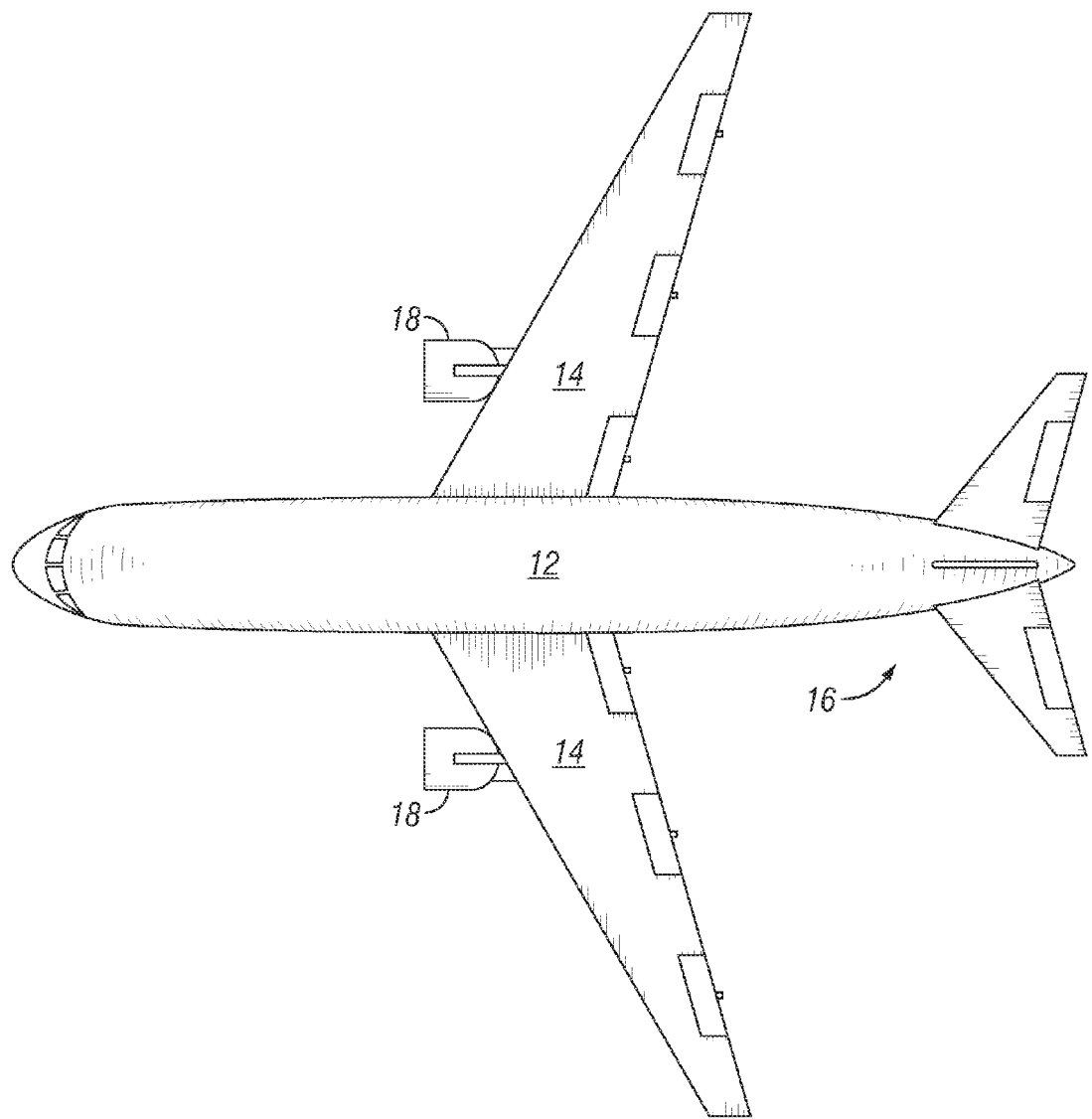
FIG. 1 schematically illustrates some aspects of a none-limiting example of an aircraft in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of a vehicle 10 in accordance with an embodiment of the present invention. In one form, vehicle 10 is an aircraft, referred to herein as aircraft 10. In other embodiments, vehicle 10 may be any type of engine powered vehicle, including one or more types of air-vehicles; land vehicles, including and without limitation, tracked and/or wheeled vehicles; marine vehicles, including and without limitation, surface vessels, submarines and/or semi-submersibles; amphibious vehicles, or any combination of one or more types of air, marine and land vehicles. In various forms, vehicle 10 may be manned and/or autonomous.

In one form, aircraft 10 includes a fuselage 12, wings 14, an empennage 16 and propulsion systems 18. In one form, aircraft 10 is a twin engine turbofan aircraft. In other embodiments, aircraft 10 may be any fixed-wing aircraft, including turbofan aircraft and turboprop aircraft. In various embodiments, aircraft 10 may have a single engine or a plurality of engines. In various embodiments, aircraft 10 may employ any number of wings 14. Empennage 16 may employ a single or multiple flight control surfaces.

Figure 2:
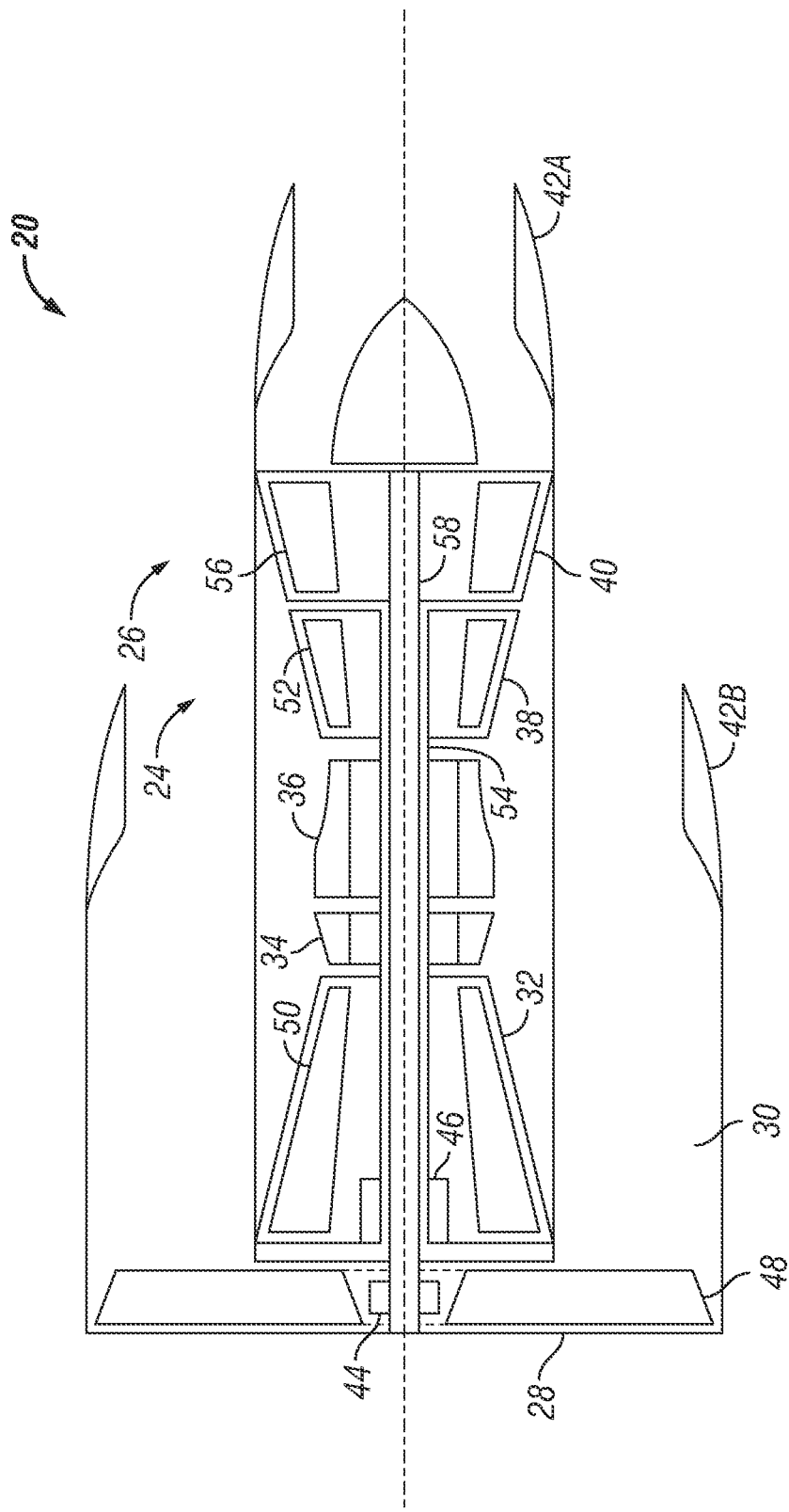
FIG. 2 schematically illustrates some aspects of a non-limiting example of a propulsion system in accordance with an embodiment of the present invention.

Referring to FIG. 2, there are illustrated some aspects of a non-limiting example of a propulsion system 18 in accordance with an embodiment of the present invention. Propulsion system 18 includes a gas turbine engine 20 and an auxiliary power unit 22 (APU 22). Although described herein as with respect to an aircraft propulsion system, in other embodiments, propulsion system 18 may be a propulsion system for providing propulsive thrust to one or more other types of vehicles, e.g., air-vehicles; land vehicles, including tracked and/or wheeled vehicles (e.g., battle tanks); marine vehicles, including surface vessels, submarines and/or semi-submersibles; amphibious vehicles; or any combination of one or more types of air, marine and land vehicles. The propulsive thrust provided by propulsion system 18 for an air vehicle in the form of one or more fast moving streams of air generated by one or more propulsors, for example and without limitation, one or more turbofans, propellers, turbines, propfans and/or other rotor systems that generate thrust. The propulsive thrust provided by propulsion system 18 to land-based vehicles may include the tractive effort provided via one or more propulsors in the form of, for example and without limitation, wheels and/or tracks, e.g., using one or more transmissions. The propulsive thrust provided by propulsion system 18 to a marine vehicle may be in the form of one or more fast moving streams of water generated by one or more propulsors in the form of, for example and without limitation, one or more propellers, shrouded and/or not shrouded; hydrojets and/or jet-pumps.

In one form, APU 22 is a secondary gas turbine engine. In other embodiments, APU 22 may be one or more other types of thermodynamic machines configured to generate mechanical power from fuel, which may be used to drive other mechanical and/or electro-mechanical machines, e.g., including generators, refrigeration systems, thermal management systems and/or any other type of machine. For example, in some embodiments, APU 22 may be a turbocharged, supercharged and/or normally aspirated piston engine or a hybrid engine.

In one form, engine 20 is a primary propulsion engine that provides thrust for flight operations of aircraft 10. In one form, engine 20 is a two spool engine having a high pressure spool 24 and a low pressure spool 26. In other embodiments, engine 20 may include three or more spools. In one form, engine 20 is a turbofan engine, wherein low pressure spool 26 powers a propulsor 28 in the form of a turbofan (fan) system, referred to herein as a turbofan or a fan system. In other embodiments, engine 20 may be a turboprop engine, wherein low pressure spool 26 powers a propulsor 28 in the form of a propeller system (not shown), e.g., via a reduction gearbox (not shown). In one form, a single engine 20 is coupled to each wing 14 of aircraft 10. In other embodiments, more than one engine 20 may be coupled to each wing 14. In still other embodiments, one or more engines 20 may be coupled to the fuselage or the empennage in addition to or in place of wing-mounted engines 20.

In one form, engine 20 includes, in addition to fan system 28, a bypass duct 30, a compressor system 32, a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. In various embodiments, engine 20 may also include an electrical machine 44 coupled to low pressure spool 26, and an electrical machine 46 coupled to high pressure spool 24. In one form, each of electrical machines 44 and 46 are operative to convert mechanical power to electrical power, and to convert electrical power to mechanical power, e.g., as in a motor/generator.

In the depicted embodiment, the core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor system 32 are in fluid communication with fan system 28. Nozzle 42B is in fluid communication with bypass duct 30. Diffuser 34 is in fluid communication with compressor system 32. Combustion system 36 is fluidly disposed between compressor system 32 and turbine system 38. Turbine system 40 is fluidly disposed between turbine system 38 and nozzle 42B. In one form, combustion system 36 includes a combustion liner (not shown) that contains a continuous combustion process. In other embodiments, combustion system 36 may take other forms, and may be, for example, a wave rotor combustion system, a rotary valve combustion system, or a slinger combustion system, and may employ deflagration and/or detonation combustion processes.

Fan system 28 includes a fan rotor system 48. In various embodiments, fan rotor system 48 includes one or more rotors (not shown) that are powered by turbine system 40. Fan system 28 may include one or more vanes (not shown). Bypass duct 30 is operative to transmit a bypass flow generated by fan system 28 around the core of engine 20. Compressor system 32 includes a compressor rotor system 50. In various embodiments, compressor rotor system 50 includes one or more rotors (not shown) that are powered by turbine system 38. Turbine system 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. Turbine system 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. Turbine system 40 is operative to discharge an engine 20 core flow to nozzle 42A.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air, and directs the diffused core airflow into combustion system 36. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58.

Figure 3:
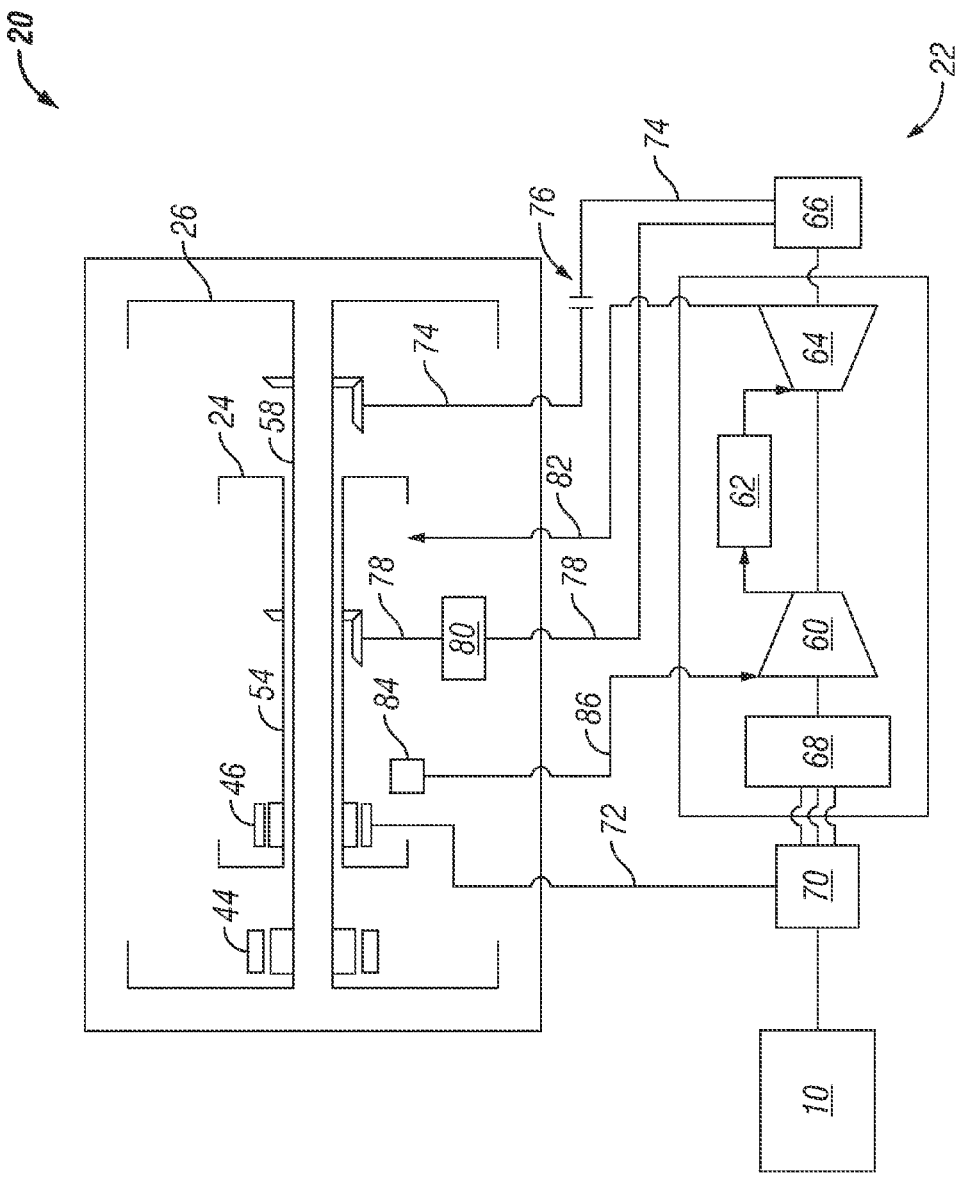
FIG. 3 schematically illustrates some aspects of a non-limiting example of a propulsion system in accordance with an embodiment of the present invention.

Referring to FIG. 3, some aspects of a non-limiting example APU 22 and some of its connections to engine 20 in accordance with an embodiment of the present invention is schematically depicted. APU 22 is coupled to both high pressure spool 24 and low pressure spool 26. APU 22 is operative to supply mechanical rotational power to both high pressure spool 24 and low pressure spool 26. In one form, APU 22 is coupled to both high pressure spool 24 and low pressure spool 26 via shafts 54 and 58, respectively, to directly drive high pressure spool 24 and low pressure spool 26. In other embodiments, other arrangements may be employed to drive both high pressure spool 24 and low pressure spool 26.

In one form, APU 22 is configured to supply rotational power to both high pressure spool 24 and low pressure spool 26 to provide sufficient thrust to taxi aircraft 10 without starting one or more engines 20. In one form, the primary component of the taxiing thrust is produced by propulsor 28. The rotational power supplied to high pressure spool 24 reduces drag on the rotation of low pressure spool 26, and may result in a secondary taxiing thrust component being produced by high pressure spool 24.

APU 22 includes an APU compressor 60, an APU combustor 62, an APU turbine 64, a reduction gearbox 66 and an electrical machine 68. The discharge of compressor 60 is in fluid communication with combustor 62. The discharge of combustor 62 is in fluid communication with turbine 64. Turbine 64 is coupled to compressor 60 and operative to drive compressor 60. In one form, reduction gearbox 66 is coupled to and driven by turbine 64. In other embodiments, reduction gearbox 66 may be coupled to compressor 60 and driven by turbine 64 via compressor 60 or a shaft extending from turbine 64. In one form, reduction gearbox 66 is considered a part of APU 22. In other embodiments, reduction gearbox 66 may be considered a separate component that is powered by APU 22. In one form, electrical machine 68 is coupled to compressor 60. In other embodiments, other mechanical arrangements may be employed. For example, electrical machine 68 may be coupled directly to turbine 64.

Electrical machine 68 is operative to convert mechanical power to electrical power. In some embodiments, electrical machine 68 may be also configured to convert electrical power to mechanical power, e.g., for starting APU 22. In some embodiments, a power conditioner 70 is electrically coupled to electrical machine 68 and operative to condition the power output of electrical machine 68, e.g., for use in supplying electrical power to one or more systems of aircraft 10 during aircraft 10 ground operations and/or flight operations. In some embodiments, electrical machine 68 is configured to provide electrical power to drive electrical machine 44 and/or electrical machine 46. For example, in one form, power generated by electrical machine 68 may be employed to start or to aid in the starting of engine 20 by providing electrical power to electrical machines 44 and/or 46. In the depiction of FIG. 3, a line 72 indicates an electrical coupling of electrical machine 46 to power conditioning unit 70 for supply power from electrical machine 68 to electrical machine 44. In other embodiments, electrical machine 68 may be electrically coupled to electrical machine 44 in addition to or in place of electrical machine 46. In still other embodiments, electrical machine 68 may not be electrically coupled to either of electrical machine 44 and electrical machine 46.

Reduction gearbox 66 is mechanically coupled to low pressure spool 26 via a shafting system 74, and is operative to drive low pressure spool 26. In one form, a clutch 76 is disposed between low pressure spool 26 and reduction gearbox 66. Clutch 76 is configured to mechanically engage and disengage APU 22 from low pressure spool 26 of the gas turbine engine 20. Some embodiments may employ an overrunning (sprag) clutch between APU 22 and low pressure spool 26.

Reduction gearbox 66 is also mechanically coupled to high pressure spool 24, via a shafting system 78, and is operative to drive high pressure spool 24. Shafting system 74 and shafting system 78 combine to couple both low pressure spool 26 and high pressure spool 24 to reduction gearbox 66. In other embodiments, one or more additional shafting systems may be employed to drive one or more other engine spools.

In one form, a transmission 80 is mechanically disposed in shafting system 78 between reduction gearbox 66 and high pressure spool 24. In some embodiments, transmission 80 may be considered a part of reduction gearbox 66. In other embodiments, transmission 80 may be considered separate from reduction gearbox 66. In still other embodiments, transmission 80 may be mechanically disposed between APU 22 and low pressure spool 26. In one form, transmission 80 is a continuously variable transmission. In other embodiments, other transmission types may be employed.

Transmission 80 is configured to vary the speed as between the high pressure spool and the low pressure spool. In one form, transmission 80 is configured to vary the speed of high pressure spool 24 relative to low pressure spool 26, e.g., in order to minimize drag while low pressure spool 26 is being powered by APU 22. In one form, transmission 80 is also configured to selectively disengage high pressure spool 24 from APU 22. In other embodiments, clutches (not shown) may be used in addition to or in place of transmission 80 to disengage high pressure spool 24 from APU 22, e.g., including overrunning clutches. In embodiments where transmission 80 is mechanically disposed between reduction gearbox 66 and low pressure spool 26, transmission 80 may be configured to disengage low pressure spool 26 from APU 22. In other embodiments, clutches (not shown) may be used in addition to or in place of transmission 80 to disengage low pressure spool 26 from APU 22.

During operation, APU 22 generates an exhaust flow. In one form, APU 22 exhaust flow is directed to engine 20, e.g., high pressure spool 24 in order to warm engine 20 prior to engine start, which may reduce the amount of time it takes to start engine 20. The APU 22 exhaust flow to engine 20 is illustrated as line 82 in FIG. 3. In various embodiments, valves and ducting (not shown) or other arrangements may be employed to direct the APU 22 exhaust flow to engine 20.

During operation, engine 20 generates a bleed flow, e.g., from high pressure spool 24. The bleed flow is discharged from high pressure spool 24 through a bleed port 84. In some embodiments, the bleed flow is directed into APU compressor 60, indicated in FIG. 3 by line 86, which increases the efficiency of APU 22, and which may reduce emissions from APU 22. The bleed flow may be supplied via valves and ducting (not shown) or by other arrangements. The bleed flow may be supplied from high pressure spool 24 during aircraft 10 flight or ground operations, including prior to engine 20 start.

In one form, APU 22 is configured to start engine 20 by supplying mechanical power to rotate high pressure spool 24. In various embodiments, APU 22 may also rotate low pressure spool 26 to aid in starting engine 20. In some embodiments, APU 22 may be configured to start engine 20 by supplying electrical power to one or both of electrical machines 44 and 46 in addition to or in place of supplying mechanical power to high pressure spool 24 and/or low pressure spool 26 via reduction gearbox 66. In one form, engine 20 is started following the completion of taxiing operations of aircraft 10. In other embodiments, engine 20 may be started during taxiing operations.

Propulsion system 18 is configured to provide sufficient thrust to taxi aircraft 10 without starting engines 20, which may result in fuel savings during taxi operations, since APU 22 is generally more efficient than engine 20 at thrust levels associated with taxiing aircraft 10. Once aircraft 10 has reached a position where it is desirable to prepare for takeoff, engines 20 may be started, and declutched from APUs 22.

By employing APU 22 to provide rotational power to low pressure spool 26 and hence propulsor 28, sufficient thrust may be provided for taxiing aircraft 10 without starting engines 20. By employing APU 22 to provide rotational power to high pressure spool 24 in addition to low pressure spool 26, friction is reduced during taxiing, e.g., aerodynamic drag within engine 20. In addition, because APU 22 may be used to start engine 20, the need for a pneumatic starter may be eliminated.

Embodiments of the present invention include a propulsion system for an aircraft, comprising: a gas turbine engine having a high pressure spool and a low pressure spool, wherein the low pressure spool is operative to drive a propulsor; and an auxiliary power unit (APU) mechanically coupled to both the high pressure spool and the low pressure spool, wherein the APU is operative to supply rotational power to both the high pressure spool and the low pressure spool.

In a refinement, the propulsion system further comprises a transmission mechanically disposed between either the high pressure spool and the APU, or between the low pressure spool and the APU.

In another refinement, the transmission is a continuously variable transmission.

In yet another refinement, the transmission is mechanically disposed between the high pressure spool and the APU.

In still another refinement, the transmission is configured to vary the rotational speed as between the high pressure spool and the low pressure spool.

In yet still another refinement, the APU generates an exhaust, and wherein the exhaust is supplied to the gas turbine engine to warm up the gas turbine engine prior to engine start.

In a further refinement, the propulsion system further comprises a clutch mechanically coupled between the APU and the gas turbine engine, wherein the clutch is configured to mechanically disengage the APU from at least one of the high pressure spool and the low pressure spool of the gas turbine engine.

In a yet further refinement, the APU includes an APU compressor; wherein the gas turbine engine generates a bleed air flow; and wherein the bleed air flow is supplied to the APU compressor.

In a still further refinement, the propulsion system further comprises a generator coupled to the APU, wherein the generator is configured to supply electrical power to the aircraft during ground operations of the aircraft and during flight operations of the aircraft.

In a yet still further refinement, the APU is configured to start the gas turbine engine by supplying mechanical power to rotate at least one of the low pressure spool and the high pressure spool.

In another further refinement, the propulsor is a turbofan of the gas turbine engine.

Embodiments of the present invention include an aircraft, comprising: a fuselage; an empennage coupled to the fuselage; a plurality of wings coupled to the fuselage; a gas turbine engine having a high pressure spool and a low pressure spool, wherein the low pressure spool is operative to drive a propulsor; and wherein the gas turbine engine is coupled to at least one of the fuselage, the empennage and at least one of the plurality of wings; an auxiliary power unit (APU) operative to supply mechanical power to the gas turbine engine via a reduction gearbox; and a shafting system mechanically coupling both the high pressure spool and the low pressure spool to the reduction gearbox, wherein the APU is operative to supply rotational power to both the high pressure spool and the low pressure spool via the shafting system and reduction gearbox.

In a refinement, the aircraft further comprises a transmission mechanically coupled between either the high pressure spool and the APU, or between the low pressure spool and the APU.

In another refinement, the transmission is a continuously variable transmission.

In yet another refinement, the transmission is configured to disengage the APU from either the high pressure spool or the low pressure spool.

In still another refinement, the power mechanically transferred from the APU to the gas turbine engine is configured to supply thrust sufficient for taxiing the aircraft.

In yet still another refinement, the aircraft further comprises an engine electrical machine coupled to the high pressure spool; and an APU electrical machine coupled to the APU, wherein the APU is configured to supply electrical power to the engine electrical machine for starting the gas turbine engine.

In a further refinement, the engine electrical machine is configured to provide electrical power to the aircraft during operation of the gas turbine engine.

In a yet further refinement, the aircraft further comprises another engine electrical machine coupled to the low pressure spool, wherein both the engine electrical machine and the other engine electrical machine are configured to provide electrical power to the aircraft during operation of the gas turbine engine.

In a still further refinement, the aircraft further comprises an engine electrical machine coupled to the low pressure spool, wherein the engine electrical machine is configured to provide electrical power to the aircraft during operation of the gas turbine engine.

Embodiments of the present invention include a system, comprising: a gas turbine engine having a high pressure spool and a low pressure spool, wherein the low pressure spool is operative to drive a propulsor; and means for supplying mechanical power to both the high pressure spool and the low pressure spool, wherein the means for supplying mechanical power is operative to supply rotational power to both the high pressure spool and the low pressure spool.

In a refinement, the system further comprises means for varying a rotational speed of one of the high pressure spool and the low pressure spool relative to the rotational speed of the other of the high pressure spool and the low pressure spool.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A propulsion system for an aircraft, comprising:
a gas turbine engine having a high pressure spool and a low pressure spool, wherein the low pressure spool is operative to drive a propulsor; and
an auxiliary power unit (APU) mechanically coupled to both the high pressure spool and the low pressure spool, wherein the APU is a thermodynamic machine configured to generate mechanical power from fuel; and wherein the APU supplies rotational power to both the high pressure spool and the low pressure spool at the same time.

2. The propulsion system of claim 1, further comprising a transmission mechanically disposed between either the high pressure spool and the APU, or between the low pressure spool and the APU.

3. The propulsion system of claim 2, wherein the transmission is a continuously variable transmission.

4. The propulsion system of claim 2, wherein the transmission is mechanically disposed between the high pressure spool and the APU.

5. The propulsion system of claim 2, wherein the transmission is configured to vary the rotational speed as between the high pressure spool and the low pressure spool.

6. The propulsion system of claim 1, wherein the APU generates an exhaust, and wherein the exhaust is supplied to the gas turbine engine to warm up the gas turbine engine prior to engine start.

7. The propulsion system of claim 1, further comprising a clutch mechanically coupled between the APU and the gas turbine engine, wherein the clutch is configured to mechanically disengage the APU from at least one of the high pressure spool and the low pressure spool of the gas turbine engine.

8. The propulsion system of claim 1, wherein the APU includes an APU compressor; wherein the gas turbine engine generates a bleed air flow; and wherein the bleed air flow is supplied to the APU compressor.

9. The propulsion system of claim 1, further comprising a generator coupled to the APU, wherein the generator is configured to supply electrical power to the aircraft during ground operations of the aircraft and during flight operations of the aircraft.

10. The propulsion system of claim 1, wherein the APU is configured to start the gas turbine engine by supplying mechanical power to rotate at least one of the low pressure spool and the high pressure spool.

11. The propulsion system of claim 1, wherein the propulsor is a turbofan of the gas turbine engine.

12. An aircraft, comprising:
a fuselage;
an empennage coupled to the fuselage;
a plurality of wings coupled to the fuselage;
a gas turbine engine having a high pressure spool and a low pressure spool, wherein the low pressure spool is operative to drive a propulsor; and wherein the gas turbine engine is coupled to at least one of the fuselage, the empennage and at least one of the plurality of wings;
an auxiliary power unit (APU) operative to supply mechanical power to the gas turbine engine via a reduction gearbox, wherein the APU is a thermodynamic machine configured to generate mechanical power from fuel; and
a shafting system mechanically coupling both the high pressure spool and the low pressure spool to the reduction gearbox, wherein the APU is operative to supply supplies rotational power to both the high pressure spool and the low pressure spool at the same time via the shafting system and reduction gearbox.

13. The aircraft of claim 12 further comprising a transmission mechanically coupled between either the high pressure spool and the APU, or between the low pressure spool and the APU.

14. The aircraft of claim 13, wherein the transmission is a continuously variable transmission.

15. The aircraft of claim 13, wherein the transmission is configured to selectively disengage the APU from either the high pressure spool or the low pressure spool.

16. The aircraft of claim 13, wherein the power mechanically transferred from the APU to the gas turbine engine is configured to supply thrust sufficient for taxiing the aircraft.

17. The aircraft of claim 12, further comprising an engine electrical machine coupled to the high pressure spool; and an APU electrical machine coupled to the APU, wherein the APU is configured to supply electrical power to the engine electrical machine for starting the gas turbine engine.

18. The aircraft of claim 17, wherein the engine electrical machine is configured to provide electrical power to the aircraft during operation of the gas turbine engine.

19. The aircraft of claim 18 further comprising an other engine electrical machine coupled to the low pressure spool, wherein both the engine electrical machine and the other engine electrical machine are configured to provide electrical power to the aircraft during operation of the gas turbine engine.

20. The aircraft of claim 12, further comprising an engine electrical machine coupled to the low pressure spool, wherein the engine electrical machine is configured to provide electrical power to the aircraft during operation of the gas turbine engine.

21. A system, comprising:
a gas turbine engine having a high pressure spool and a low pressure spool, wherein the low pressure spool is operative to drive a propulsor; and
means for supplying mechanical power to both the high pressure spool and the low pressure spool, wherein the means for supplying mechanical power includes means for generating the mechanical power from fuel, and includes means for supplying rotational power to both the high pressure spool and the low pressure spool at the same time.

22. The system of claim 21, further comprising means for varying a rotational speed of one of the high pressure spool and the low pressure spool relative to the rotational speed of the other of the high pressure spool and the low pressure spool.

* * * * *

UNITED STATES PATENT AND TRADEMARK OFFICE
CERTIFICATE OF CORRECTION

PATENT NO. : 8,690,099 B2  
APPLICATION NO. : 12/947482  
DATED : April 8, 2014  
INVENTOR(S) : Burns et al.

It is certified that error appears in the above-identified patent and that said Letters Patent is hereby corrected as shown below:

In the claims,

Col. 9, line 17 (Claim 12): remove the term "is operative to supply" so that the claim reads:

"...to the reduction gearbox, wherein the APU supplies rotational power to both the..."

Signed and Sealed this  
Fifteenth Day of December, 2015

Michelle K. Lee  
*Director of the United States Patent and Trademark Office*